United States Patent [19]
Gasperino

[11] Patent Number: 5,938,215
[45] Date of Patent: Aug. 17, 1999

[54] HANDTRUCK HOLSTERS FOR CLIPBOARDS

[76] Inventor: Joseph A. Gasperino, 1620 Yates Dr., Merritt Island, Fla. 32952

[21] Appl. No.: 08/871,796

[22] Filed: Jun. 6, 1997

Related U.S. Application Data

[63] Continuation-in-part of application No. 08/721,257, Sep. 26, 1996, which is a continuation-in-part of application No. 08/661,162, Jun. 8, 1996, abandoned.

[51] Int. Cl.[6] ........................................................ B62B 1/00
[52] U.S. Cl. .................................... 280/47.27; 280/47.19; 280/47.28; 224/277
[58] Field of Search .............................. 280/47.27, 47.28, 280/47.19, 43, 12, 47.34, 47.24, 33.992; 224/411, 277; 248/225.11, 309.4

[56] References Cited

U.S. PATENT DOCUMENTS

| | | | |
|---|---|---|---|
| 2,131,673 | 9/1938 | Robinson | 280/47.19 |
| 4,274,567 | 6/1981 | Sawyer | 280/33.992 |
| 4,743,050 | 5/1988 | Small | 281/45 |
| 5,012,966 | 5/1991 | Turner et al. | 280/33.992 |
| 5,072,957 | 12/1991 | Graebe, Jr. | 248/309.4 |
| 5,159,777 | 11/1992 | Gonzalez | 280/47.19 |
| 5,176,392 | 1/1993 | Graebe, Jr. | 248/309.4 |
| 5,415,420 | 5/1995 | Koeller | 280/47.28 |
| 5,464,104 | 11/1995 | McArthur | 280/47.19 |
| 5,480,078 | 1/1996 | Verrette et al. | 280/47.19 |
| 5,660,403 | 8/1997 | O'Neill et al. | 280/47.19 |

FOREIGN PATENT DOCUMENTS

| | | | |
|---|---|---|---|
| 1324030 | 5/1962 | France | 280/47.27 |
| 732276 | 6/1955 | United Kingdom | 280/47.19 |

*Primary Examiner*—Darnell M. Boucher
*Attorney, Agent, or Firm*—Brian S. Steinberger; Law Offices of Brian S. Steinberger

[57] ABSTRACT

Holsters for supporting clipboards to cross-braces on hand trucks. A first version includes a rectangular box having a longitudinal slot for receiving the clipboard therethrough, the box has a solid base for receiving the bottom edge of the clipboard and interior bent metal tab for locking the clipboard within the box. A spring clip couples the box to an existing cross-brace on the handtruck. A second version has a second longitudinal slot in the bottom of the box so that the clip board passes through both the top and the bottom slots. Another version has a top box and a bottom box pivotally attached to one another by two parallel plates. The top box has a through-hole shaped longitudinal slot for allowing the entire clipboard to pass therethrough and the bottom box has an interior base for supporting the lower edge of the clipboard. A spring clip attaches the top and bottom boxes to a cross-brace on the handtruck.

4 Claims, 6 Drawing Sheets

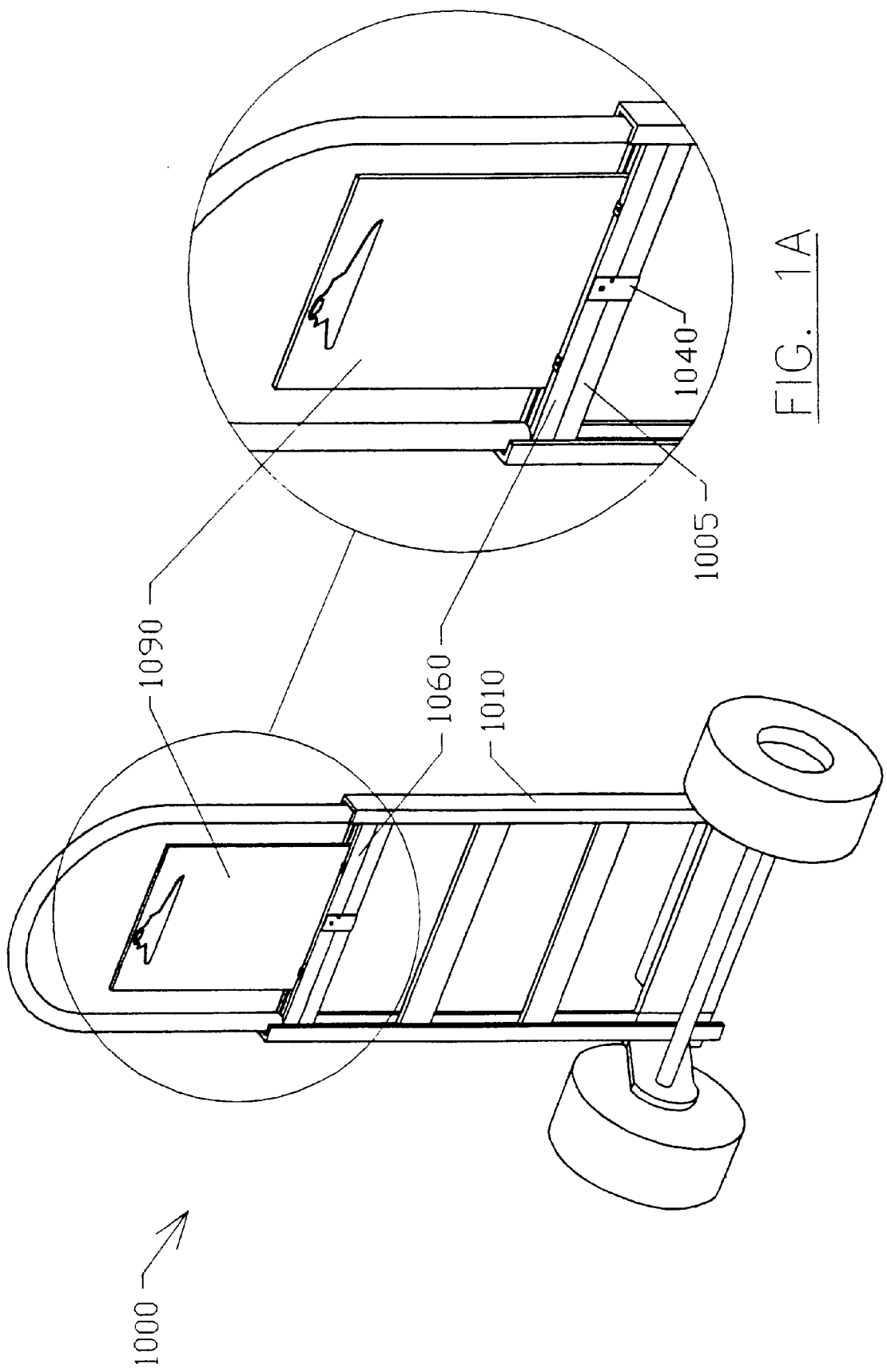

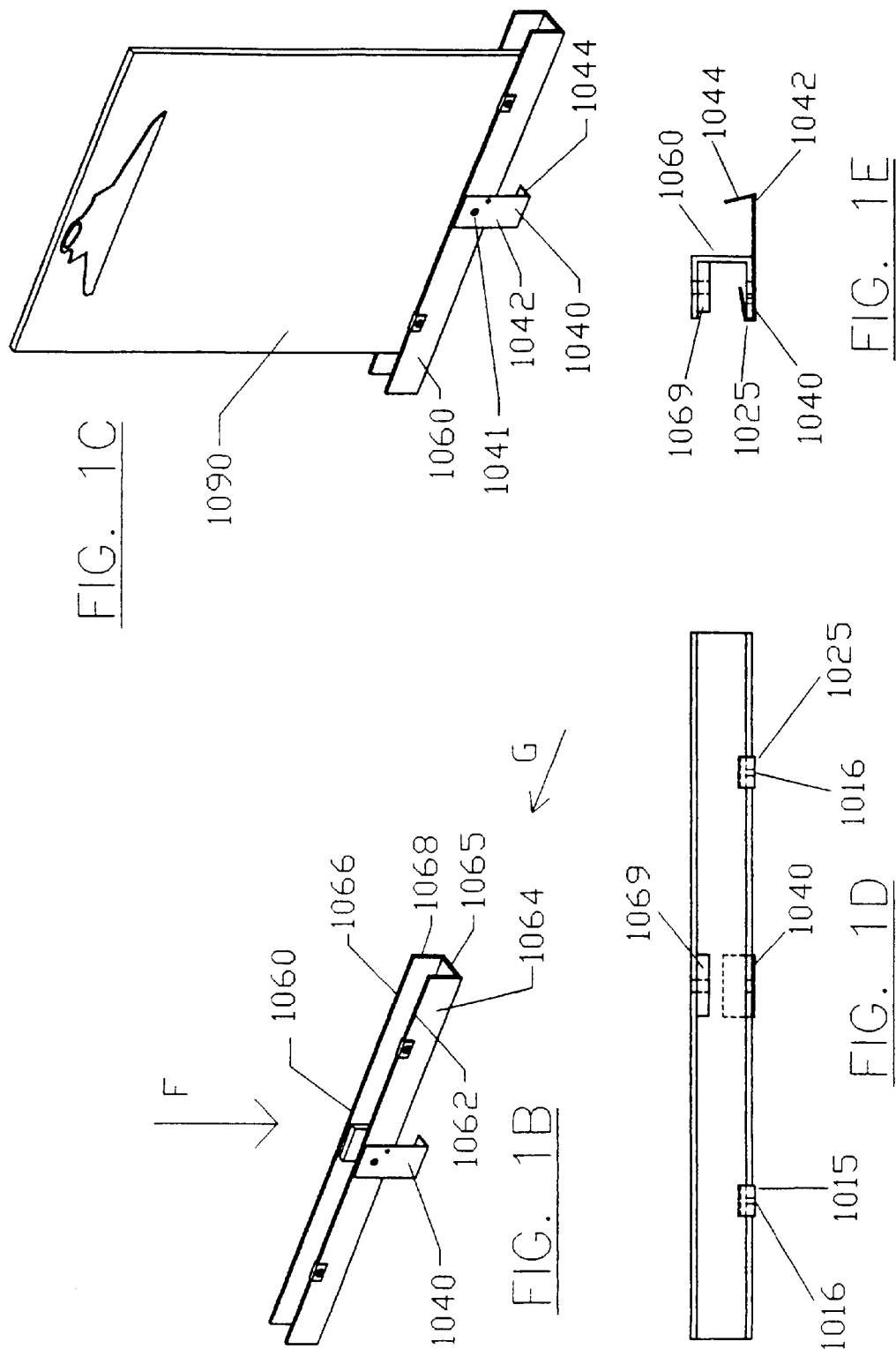

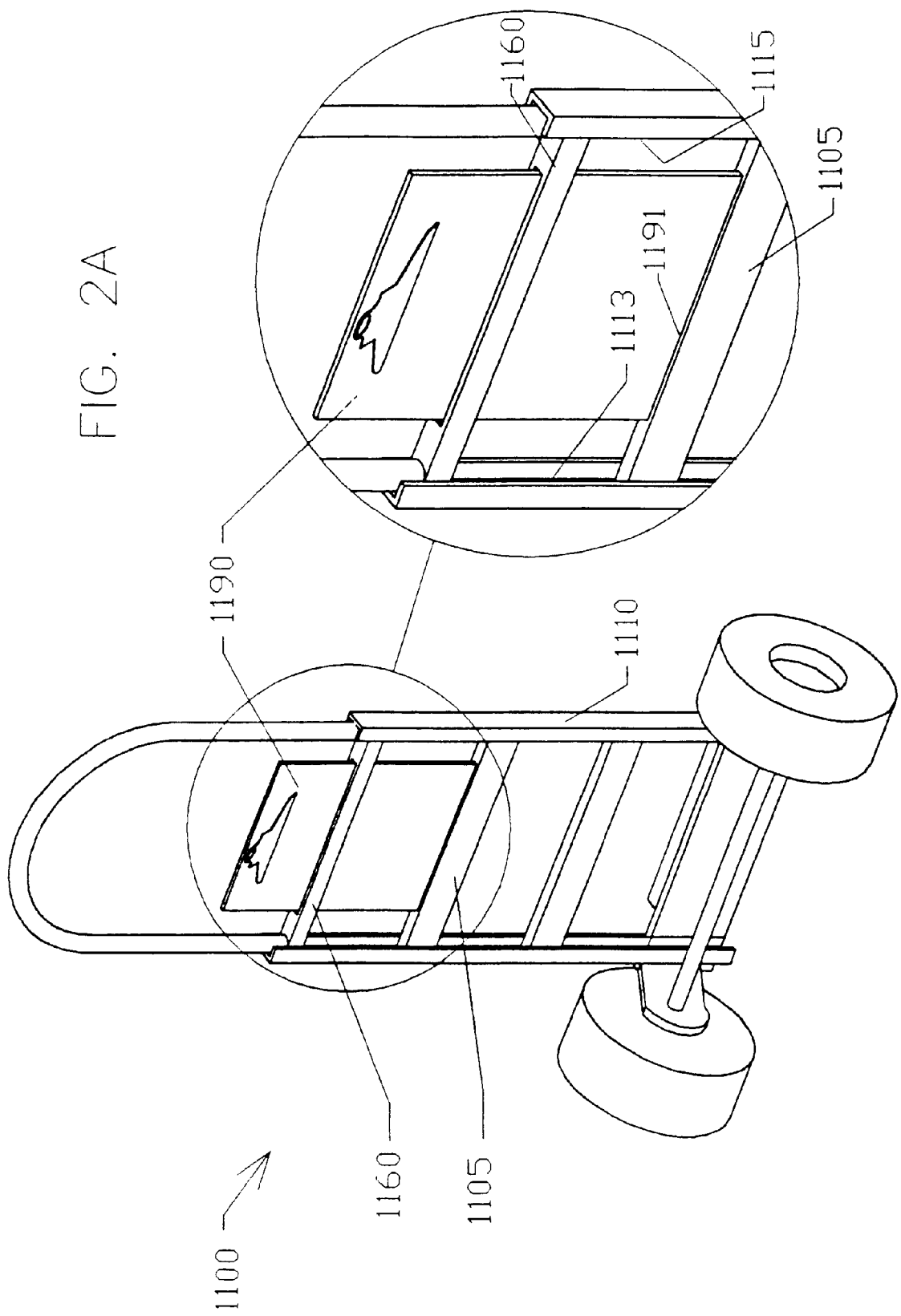

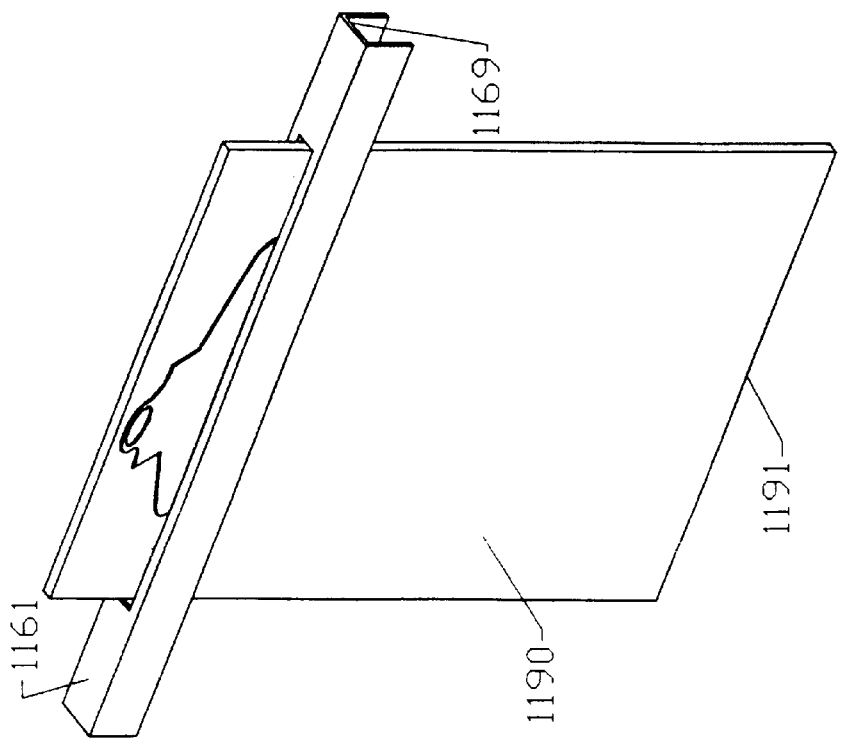
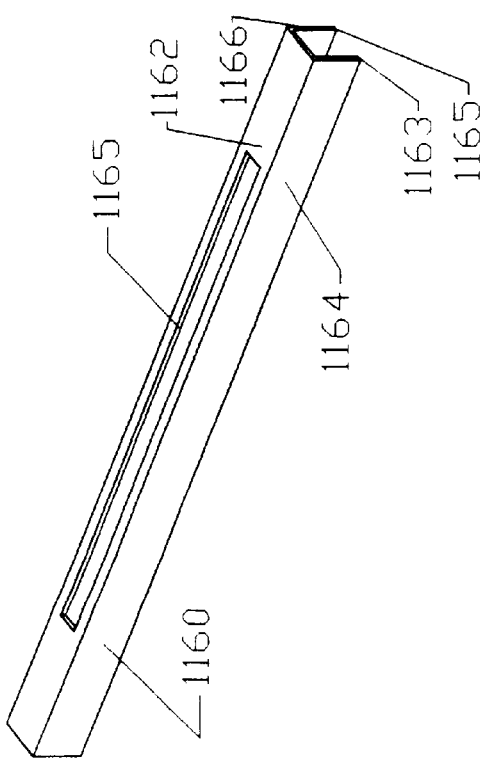

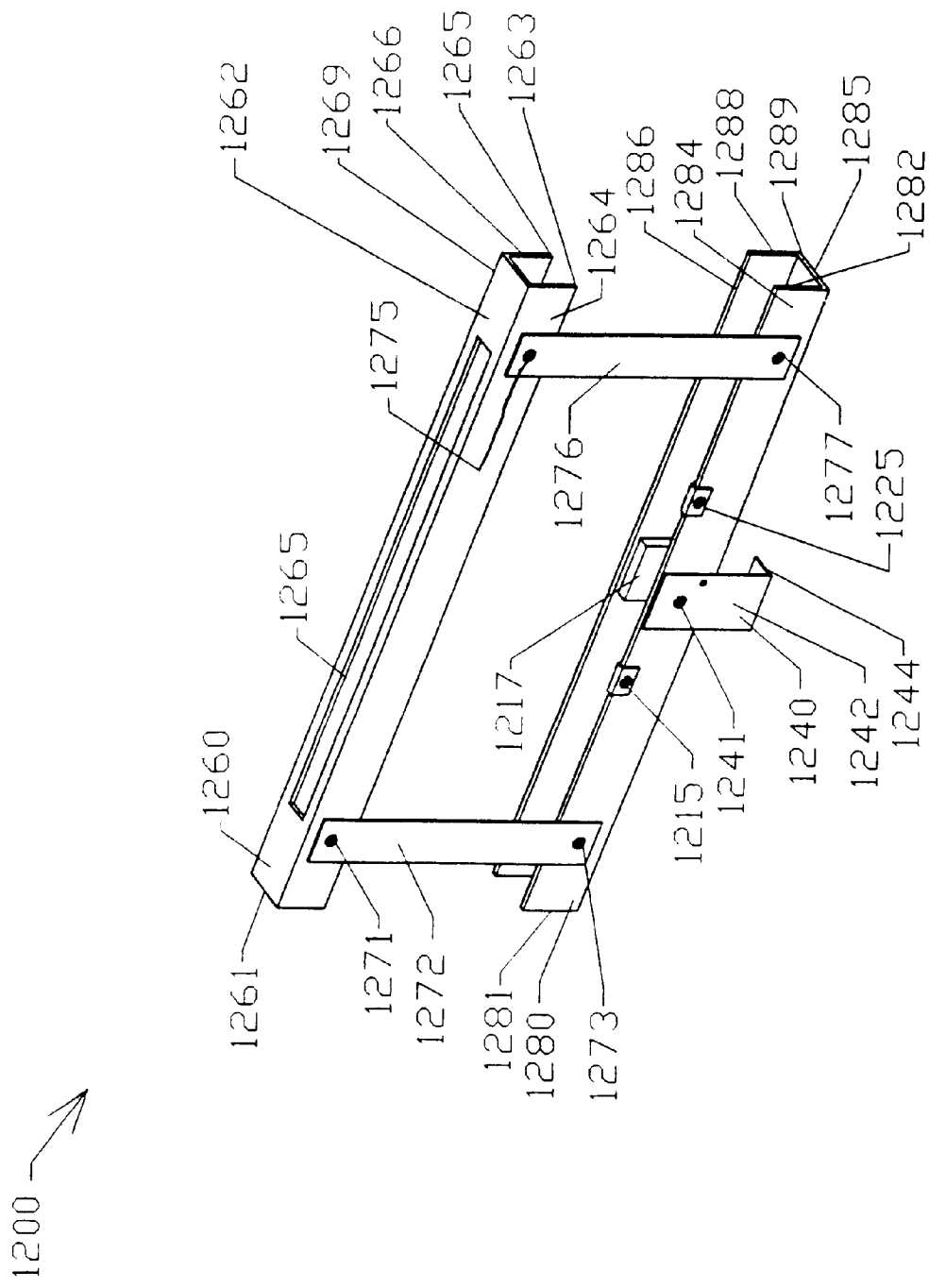

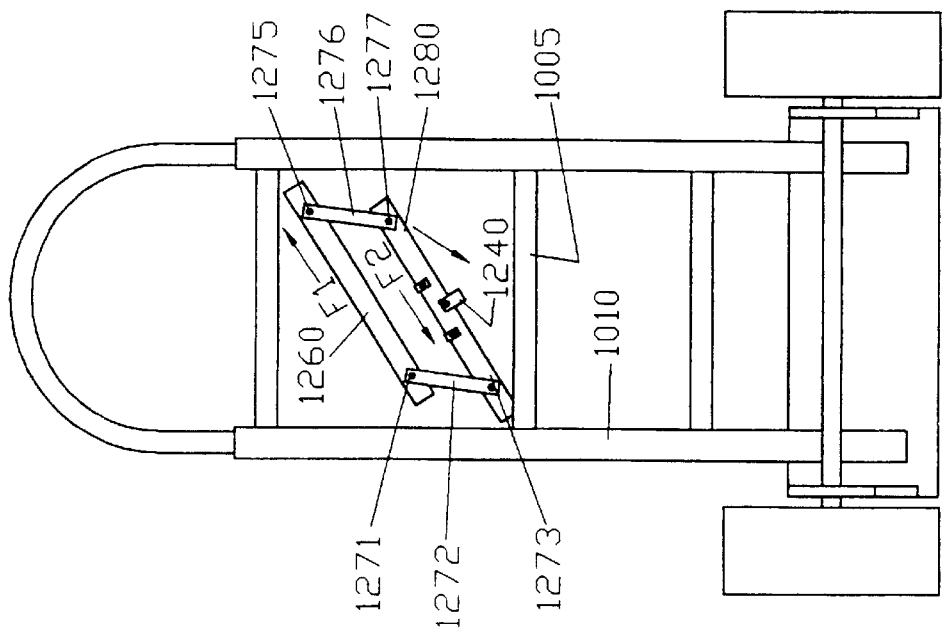
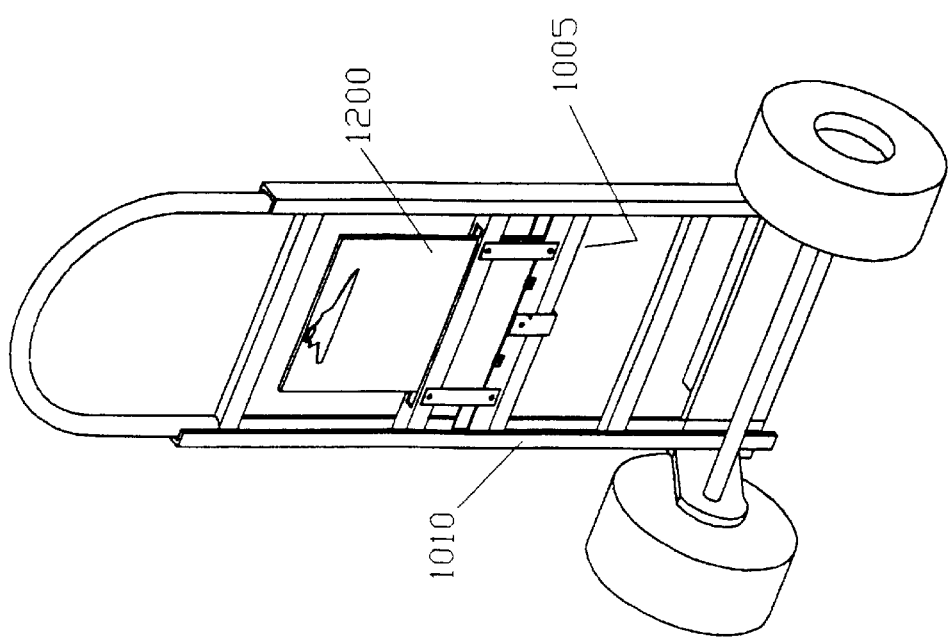

HANDTRUCK HOLSTERS FOR CLIPBOARDS

This invention relates to holders for clipboards, and in particular to a removable holsters for clipboards that mounts to handtrucks. This application is a Continuation-In-Part of U.S. application Ser. No. 08/721,257 Filed on Sep. 26, 1996, which is a Continuation-In-Part of U.S. application Ser. No. 08/661,162 Filed on Jun. 8, 1996 now abandoned, by the same inventor.

BACKGROUND AND PRIOR ART

Servicemen and delivery men, such as truck drivers, often need to carry clipboards when making service calls and when making deliveries. The problem becomes cumbersome and difficult to hand carry the clipboard while the servicemen is simultaneously using a handtruck. Well known handtrucks do not have any means for storing and/or holding clipboards. See For example, U.S. Pat. No. 5,244,221 to Ward.

SUMMARY OF THE INVENTION

The primary objective of the present invention is to provide clipboard holsters that can be attached to handtrucks.

Holsters for attaching clipboards to handtrucks include a handtruck having a frame, the frame having an upper handgrip end, and a lower end with wheels and a baseplate for supporting a load, a rectangular holster for attachment to the handtruck, and a clipboard being supported by the holster. The rectangular box has an upper slot opening for receiving a lower edge of the clipboard, and a spring clip connected to the box for coupling and decoupling the box from a cross-brace on the handtruck. The interior of the box can include a bent tab for being compressible between the clipboard and the box. Another embodiment of the rectangular box has a top longitudinal slot and a bottom longitudinal slot, the top slot and the bottom slot allows the clip board to be inserted therethrough. A still another embodiment of the holster includes both a top box having throughhole shaped longitudinal slot for allowing the clip board to be inserted therethrough, and a bottom box parallel to the top box having a lower base for supporting a lower edge of the clipboard, as well as a spring clip for attaching the top box and the bottom box to the handtruck. Parallel vertical plates are pivotally attached to both the top and the bottom boxes. The bottom box can further include a bent tab for being compressible between the clipboard and the box.

Further objects and advantages of this invention will be apparent from the following detailed description of a presently preferred embodiment which is illustrated schematically in the accompanying drawings.

BRIEF DESCRIPTION OF THE FIGURES

FIG. 1A is a perspective view of a clipboard holster attachment for a handtruck.

FIG. 1B shows the clipboard holster of FIG. 1A without a clipboard unattached to a handtruck.

FIG. 1C shows the clipboard holster of FIG. 1B with a clipboard.

FIG. 1D is a top view of the clipboard holster of FIG. 1B along arrow F.

FIG. 1E is a side view of the clipboard holster of FIG. 1B along arrow G.

FIG. 2A is a perspective view of another clipboard holster attachment for a handtruck.

FIG. 2B is a view of the clipboard holster of FIG. 2A without a clipboard and handtruck.

FIG. 2C is a view of the clipboard holster of FIG. 2B with a clipboard.

FIG. 3A is a perspective view of another clipboard holster for a handtruck.

FIG. 3B is a view of the holster embodiment of FIG. 3A with a handtruck.

FIG. 3C is a view of angling the holster embodiment of FIG. 3A onto a handtruck.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

FIG. 1A is a perspective view of a clipboard holster attachment 1000 for a handtruck 1010. FIG. 1B shows the clipboard holster 1000 of FIG. 1A without a clipboard 1090 unattached to a handtruck 1010. FIG. 1C shows the clipboard holster 1000 of FIG. 1B with a clipboard 1090. FIG. 1D is a top view of the clipboard holster 1000 of FIG. 1B along arrow F.

FIG. 1E is a side view of the clipboard holster 1000 of FIG. 1B along arrow G. Referring to FIGS. 1A–1D, embodiment 1000 includes an elongated rectangular box 1060 having an opening between top portions 1062, 1066 which connect to sidewalls 1064, 1068 and bottom 1065. Interior angled bent metal tabs 1015, 1025 connected by fasteners 1016, 1026 such as rivets, bolts, welds, function as compressible springs along with rear insertion metal tab 1069 to support the lower portion of a clipboard 1090. Spring clip 1040 attached by a fastener 1041 (such as a screw, weld, and the like) has a back plate 1042 and an approximately 80 degree angled bottom plate 1044 which snapably wraps about a lower surface of a rectangular cross-brace 1005 on a handtruck 1010.

FIG. 2A is a perspective view of another clipboard holster attachment 1100 for a handtruck 1110. FIG. 2B is a view of the clipboard holster attachment 1100 of FIG. 2A without a clipboard 1190 and unattached to a handtruck 1110. FIG. 2C is a view of the clipboard holster of FIG. 2B with a clipboard 1190. Referring to FIGS. 2A–2C, embodiment 1100 includes an elongated rectangular box 1160 having an opening between bottom portions 1163, 1165 which connect to sidewalls 1164, 1166 and a top surface 1162 having an elongated slot opening 1165 therethrough. The ends 1161, 1169 of box 1160 can fit into and mate within the interior facing grooves of side legs 1113, 1115 of handtruck 1110. Although ends 1161, 1169 are shown as having flat surfaces perpendicular to sides 1162, 1164, the ends can be concave curved if the inward facing surfaces of handtruck side legs are cylindrical and/or convex curve shaped. The rectangular box 1160 can be substituted for the existing handtruck cross-brace bar 1060 shown in FIGS. 1A–1E. A clipboard 1190 can be inserted through elongated slot opening 1165 with a bottom portion 1191 abuting against another crossbrace bar 1105 existing on a handtruck 1110.

FIGS. 3A–3B are perspective views of another clipboard holster 1200 for use with handtruck such as the handtruck 1010 shown in FIG. 1A. Embodiment 1200 includes an upper rectangular box 1260 constructed similar to box 1160 of FIGS. 2A–2C. Box 1260 includes an opening between bottom portions 1263, 1265 which connect to sidewalls 1264, 1266 and a top surface 1262 having an elongated slot opening 1265 therethrough. Embodiment 1200 further includes a lower rectangular box 1280 which is similar to the rectangular box 1060 of FIGS. 1A–1E. Upper rectangular box 1260 can be connected to support plates 1272, 1276 by fasteners 1271, 1275 such as screws, bolts and the like. Lower box 1280 can be connected to plates 1272, 1276 by similar fasteners 1273, 1277 such as but not limited to screws, bolts and the like. Lower box 1280 of FIG. 3A has an opening between top portions 1282, 1286 which connect to sidewalls 1284, 1288 and bottom 1285. Interior angled bent metal tabs 1215, 1225 (similar to those shown in FIGS. 1A–1E) function as compressible springs along with rear insertion metal tab 1217. Spring clip 1240 attached by a fastener 1241 (such as those previously described) has a back plate 1242 and an approximately 80 degree angled bottom plate 1244 which snapably wraps about a lower surface of a rectangular cross-brace 1005 on a handtruck 1010 shown in FIGS. 1A–1E. The ends 1261, 1269 of box 1260 and the ends 1281, 1289 of box 1280 of FIG. 3A can fit into and mate within the interior facing grooves of side legs 1113, 1115 of handtruck 1110 shown in FIG. 2A. Although ends 1261, 1269, 1281, 1289 are shown as having surfaces perpendicular to the sidewalls of the boxes 1260, 1280, these ends can be concave curved if the inward facing surfaces of the handtruck side legs are cylindrical and/or convex curve shaped. The rectangular boxes 1260, 1280 of FIG. 3A can be substituted for the existing handtruck cross-brace bar(s) 1060 shown in FIGS. 1A–1E. A clipboard (such as 1190 of FIG. 2A) can be inserted through elongated slot opening 1265 and passed through the opening between portions 1282, 1286 to abut against the lower interior base wall 1285 of box 1280.

FIG. 3C is a view of angling the holster embodiment 1200 of FIG. 3A onto a handtruck 1010. To insert embodiment 1200, box 1260 is moved in the direction of arrow F1, while box 1280 is moved in the opposite direction F2, which causes the boxes 1260, 1280 and plates 1272, 1276 to pivot about fasteners 1271, 1275 and 1273 and 1277, respectively. Spring clip 1240 is wrapped about handtruck cross-brace 1005 to a closed position as shown in FIG. 3B.

Although the preferred embodiment describes the novel holsters as being formed from aluminum, the invention can be formed from other materials such as but not limited to stainless steel, galvanized steel, molded plastic, fiberglass and combinations thereof.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. The handtruck assembly comprising in combination:

a handtruck having a frame, the frame having an upper handgrip end, and a lower end with wheels and a baseplate for supporting a load;

a holster for attachment to the handtruck, the holster includes a first box having a top longitudinal slot and a bottom longitudinal slot, the top slot and the bottom slot for allowing a clip board to be inserted therethrough;

a bottom box parallel to the first box having a lower base for supporting a lower edge of the clipboard:

a spring clip for attaching the first box and the bottom box to the handtruck; and a first vertical plate for attaching the first box to the bottom box, the first vertical plate pivotally connected to both the first box and the bottom box.

2. The handtruck assembly of claim 1, wherein the holster further includes:

a second vertical plate parallel to the first vertical plate for attaching the first box to the bottom box, the second vertical plate pivotally connected to both the first box and to the bottom box.

3. The handtruck assembly comprising in combination:

a handtruck having a frame, the frame having an upper handgrip end, and a lower end with wheels and a baseplate for supporting a load;

a holster for attachment to the handtruck, the holster includes a first box having a top longitudinal slot and a bottom longitudinal slot, the top slot and the bottom slot for allowing a clip board to be inserted therethrough;

a bottom box parallel to the first box having a lower base for supporting a lower edge of the clipboard;

a spring clip for attaching the first box and the bottom box to the handtruck; and a bent tab within the bottom box for being compressible between the clipboard and the bottom box.

4. A handtruck assembly comprising in combination:

a handtruck having a frame, the frame having an upper handgrip end, and a lower end with wheels and a baseplate for supporting a load;

a top box having a top longitudinal slot and a bottom longitudinal slot, the top slot and the bottom slot for allowing a clip board to be inserted therethrough;

a bottom box parallel to the top box having a lower base for supporting a lower edge of the clipboard;

a bent tab within the bottom box for being compressible between the clipboard and the bottom box;

vertical plates parallel to one another, the vertical plates pivotally connected to both the top box and to the bottom box; and a spring clip for attaching the top box and the bottom box to the handtruck.

\* \* \* \* \*